United States Patent [19]

Landy

[11] Patent Number: 5,120,331
[45] Date of Patent: Jun. 9, 1992

[54] COMPOSITE GAS FILTERING UNIT

[76] Inventor: Keith Landy, 6175 NW. 153rd St., Miami Lakes, Fla. 33014

[21] Appl. No.: 593,851

[22] Filed: Oct. 5, 1990

Related U.S. Application Data

[63] Continuation-in-part of Ser. No. 474,989, Feb. 6, 1990, abandoned.

[51] Int. Cl.$^5$ ................. B01D 46/02; B01D 53/04
[52] U.S. Cl. ..................................... 55/74; 55/98; 55/316; 55/387; 55/471; 55/473; 55/521; 55/524
[58] Field of Search ............ 55/74, 97, 98, 278, 55/316, 385.2, 387, 389, 467, 486, 489, 497–499, 514, 520, 524, 465, 471–473, 521

[56] References Cited

U.S. PATENT DOCUMENTS

| | | | |
|---|---|---|---|
| 1,693,958 | 12/1928 | Patten | 55/520 X |
| 2,038,071 | 4/1936 | Wilhelm | 55/524 X |
| 2,400,180 | 5/1946 | Venable | 55/498 |
| 2,425,235 | 8/1947 | Ferrante | 55/524 X |
| 2,936,855 | 5/1960 | Allen et al. | 55/521 X |
| 2,968,361 | 1/1961 | Buckman | 55/524 X |
| 3,015,367 | 1/1962 | Smith et al. | 55/387 |
| 3,020,977 | 2/1962 | Huppke et al. | 55/520 |
| 3,308,610 | 3/1967 | Springer et al. | 55/471 |
| 3,415,384 | 12/1968 | Kasten | 55/486 X |
| 3,563,004 | 2/1971 | Schouw | 55/471 X |
| 3,664,095 | 5/1972 | Asker et al. | 55/387 |
| 3,799,354 | 3/1974 | Buckman et al. | 55/521 X |
| 4,046,939 | 9/1977 | Hart | 55/387 X |
| 4,102,785 | 7/1978 | Head et al. | 55/520 X |
| 4,234,326 | 11/1980 | Bailey et al. | 55/387 X |
| 4,259,096 | 3/1981 | Nakamura et al. | 55/524 X |
| 4,300,918 | 11/1981 | Cary | 55/486 X |
| 4,510,193 | 4/1985 | Blücher et al. | 55/524 X |
| 4,629,482 | 12/1986 | Davis | 55/471 X |
| 4,877,527 | 10/1989 | Brownell | 55/520 X |

FOREIGN PATENT DOCUMENTS

| | | | |
|---|---|---|---|
| 2500470 | 7/1975 | Fed. Rep. of Germany | 55/524 |
| 58-146421 | 9/1983 | Japan | 55/389 |
| 61-192319 | 8/1986 | Japan | 55/498 |
| 668705 | 3/1952 | United Kingdom | 55/498 |

*Primary Examiner*—Robert Spitzer
*Attorney, Agent, or Firm*—Jack E. Dominik

[57] ABSTRACT

A comprehensive gas filtering unit in which the preferred embodiment includes sheet(s) of flexible, coilable, permeable, carbon impregnated fabric that are spirally wound around a center structure is disclosed. Active gas filtering spacers are optionally employed between the adjacent layers of wound fabric to physically separate same, thus creating air flow channel(s). Further, the active filtering spacers promote pneumatic agitation and pressure differentials. The air path typically is shaped to varying patterns including an outward flow perpendicular to or traversing the layers of the filtering fabric; flow through the actively filtering spacers; and parallel flow along the surfaces of the filtering fabric and the actively filtering spacers, with varying combinations of these patterns repeatedly occurring throughout the gas filtering chamber. Each spacer contains one or more of a variety of types of filtering agents with spacers being employed in combination in the filtering unit, in order to effectively handle a diverse group of contaminant gases. In one embodiment a central manifold structure utilizes airflow infuser wings that facilitate attachment of the fabric. The airflow infuser wings form inlets to the filtering channels and provide structural support for the channels. The infuser wings are strategically positioned around a central air handling impeller wheel that forces air outward through the infuser wings and subsequently into the filtering channels. This direct entry of the air results in minimal resistance to the airflow.

17 Claims, 4 Drawing Sheets

COMPOSITE GAS FILTERING UNIT

CROSS-REFERENCE TO RELATED APPLICATIONS

This application is a continuation-in-part of application Ser. No. 474,989 filed Feb. 6, 1990 by the inventor herein and entitled "Composite Gas Filtering Unit", now abandoned.

FIELD OF THE INVENTION

The present invention relates in general to a gas filtering unit as well as a method for filtering gas. Specifically, the invention relates to a filtering unit and method that is highly effective and efficient in the filtration of a diverse range of contaminant gases, in a single airflow pass through a unitized structure containing a variety of types of filtering agents.

SUMMARY OF THE PRIOR ART

It is known in gas filtration technology to utilize activated or specially treated carbon to remove contaminant gases from air. Carbon pellets are most typically contained in rigid trays, most commonly constructed of metal, with a plurality of such trays arranged in a flow-through structure. These carbon tray arrangements often present a number of problems and limitations. A common problem is the settling and shifting of pellets during transportation, installation and operation, resulting in channeling and packing of pellets, thus allowing the contaminant gases to bypass the carbon. Further problems relate to the cumbersome and messy reloading procedures that are often required; the discarding of costly trays that are no longer reusable; and the continual shedding of carbon dust. In many filtering methods it is necessary to utilize a variety of filtering agents to effectively handle diverse combinations of contaminant gases. The combined utilization of various, segregated filtering agents have typically required the use of expensive, cumbersome and inactive (non-filtering) housings and frames for each type of filtering agent. Further, if various filtering agents are mixed in one tray, inconsistent exposure of contaminant gases to the various agents may occur. Further, some filtering agents may react unfavorably when mixed with other agents.

In carbon filtration technology, it has been established that the use of fine carbon granules is beneficial to provide an increased surface/exposure area to maximize utilization of the carbon media. Fine granules, however, are not easily contained in trays and typically create high levels of air flow resistance. To remedy these problems, fine carbon granules may be embedded into a fibrous fabric and thus, advantageously employed. An additional problem of the prior art is the inefficient transfer of air from the blower into and onto the filter. The prior art requires multiple gaskets and plenums to transfer the air from the blower to the filter.

SUMMARY OF THE INVENTION

The present invention is directed to a comprehensive gas filtering unit in which the preferred embodiment includes a sheet of flexible, coilable, permeable, carbon impregnated fabric that is wound around a center core structure. Active gas filtering spacers are optionally employed between the adjacent layers of wound fabric to physically separate same, thus creating the air flow channel. Further, the active filtering spacers promote pneumatic agitation and pressure differentials. Inert spacers will do the same. Spacers made of the fabric do the same and augment the filtering action. Each active spacer contains one or more of a variety of types of filtering agents and said spacers can be employed in combination in the filtering unit, in order to effectively handle a diverse group of contaminant gases. Thus, filtering agents that are adsorptive, absorptive, chemisorptive, reactive as well as particulate filtering media may be incorporated into the singular filtering unit. The center core structure of the gas filtering unit may be a perforated tube with one end serving as the air inlet and the other being sealed. In an alternative embodiment, the center core structure intrinsically incorporates a HEPA (High Efficiency Particulate Air) filter.

In the first preferred embodiment, the outer casing of the filtering unit also serves as a means for effectively encapsulating and sealing the unit. The contaminated air source is forced into the center core structure by an external means such as a blower. Subsequently, the air passes through the perforations of the center core structure and is dispersed into the gas filtering chamber, which includes the wound filtering fabric and the actively filtering spacers. According to the method of the present invention, the air essentially follows a spiral-like path as it passes along and through the adjacent layers of filtering fabric and actively filtering spacers until the gas-filtered air finally emerges from the exterior of the outermost layer of fabric. The air path typically is shaped to varying patterns including an outward flow perpendicular to or traversing the layers of the filtering fabric; flow through the actively filtering spacers; and parallel flow along the surfaces of the filtering fabric and the actively filtering spacers, with varying combinations of these patterns repeatedly occurring throughout the gas filtering chamber. The actively filtering spacers, the spiral-like air flow path and the fibrous nature of the fabric, facilitate a high level of air flow turbulence, thus maximizing contact of the contaminant gases with the filtering agents. Further, specific configurations of the actively filtering spacers within the air flow channel create controlled areas of increased pressure differentials, thus maximizing perpendicular or transverse flow through the filtering fabric. The filtering unit is most typically operated with a positive pressure air source directing the contaminant gases into the air inlet of the center core structure. In certain applications the filtering unit may be operated under negative pressure. The present invention is also directed to a gas filtering device in which a unitized gas and particulate filtering component comprises a plurality of filtering channels that are attached to a central manifold structure.

The second preferred embodiment comprises a plurality of sheets of flexible, coilable, permeable carbon impregnated fabric that are each attached at one end to a nonpermeable rigid and smooth airflow infuser wing. The infuser wings with the sheets of attached filter fabric are circularly aligned and incorporate a central open area that houses the air moving impeller wheel. The wings are spaced apart to provide airflow slots for the direct infusion of the contaminated air from the impeller wheel into the air filtering channels. The plurality of sheets of filtering fabric are secured to the outer edges of the infuser and then wound around the central manifold. The central manifold is defined by the inner edges of the infuser wings which in turn define the outer portion of the central manifold. Actively filtering spacers are optionally employed between the layers of wound fabric sheets to physically separate same, thus maintaining the air flow channels. An additional sheet of particulate filtering material is optionally employed around the assembly of wound sheets of gas filtering fabric as a final filter and protective wrap. The complete filter component comprising of the wound air flow infuser wings with their attached sheets of gas filtering fabric, the active filtering spacers, and the particulate filter final wrap are potted into opposed end caps. The structural and pneumatic integrity of the filter component is secured by this potting process. An air handling impeller wheel is positioned in the central manifold structure. The infuser wings incorporate an appropriate length, curvature and alignment and initiate the formation of the filtering channels.

In view of the foregoing, it is an object of the present invention to provide a gas filtering unit and method of filtering that utilizes a single or a variety of gas filtering agent, in combination, which may include prescribed combinations of adsorptive, absorptive, chemisorptive and reactive agents as well as particulate filtering media incorporated into a single structure.

Another object of the present invention is to provide a gas filtering unit that effectively handles a diverse range of contaminant gases in a single air flow pass through the said filtering unit, thus avoiding the need for recirculation for many applications.

A further object is directed to a gas filtering method that insures maximized contact, exposure and dwell time of the contaminant air with the filtering agents.

A further object is the provision of a gas filtering unit that is disposable and easily changed, requiring no reloading or other time consuming, cumbersome or messy changing procedures.

A further object is the method of using a gas filtering unit which neatly and effectively encapsulates and seals within its outer casing, thus minimizing or precluding contact of contaminated filter components with personnel and the ambient area. The filtering unit is rendered suitable for critically clean environments, such as electronic and pharmaceutical clean rooms.

An even further object is directed to a gas filtering unit that may undergo relatively high levels of stress during transportation and operation without adverse effects to the unit. The unit is thus operable in moving vehicles. Additionally, the unit may be positioned in any orientation, whether vertical or horizontal, or any combination in between, thus easily permitting mounting and retro-fitting in various applications.

A still further object is the provision of a gas filtering unit in which there is a high ratio of actively filtering components to non-active supportive structural components. The high constituency of actively filtering components also enhances efficiency and economy of proper disposal.

Yet another object of the present invention, in one of its embodiments, is directed to a gas filtering unit that is primarily designed to remove gases but also incorporates a HEPA filter for removing particulate matter within its singular structure, with said unit being particularly compact and simply constructed.

Another object of this embodiment is the provision of a gas filtering device in which the filtering materials surround the air moving system and effectively muffle blower noise.

Yet another object, is the provision of a gas filtering device in which the blower and filter are a matched system, thus eliminating the need for air flow plenums or transition structures. There is a calculated balance of all filtering and air handling components thus minimizing static pressure and allowing the device to be especially energy efficient.

A further, but not final object, is the provision of a gas filtering unit that contains a minimum of components, many of which have a dual function, and a device that is simply y and efficiently manufactured, and is particularly compact and portable.

BRIEF DESCRIPTION OF THE DRAWINGS

Further objects and advantages of the present invention will be readily understood as the following description proceeds, taken in conjunction with the accompanying drawings, in which.

DETAILED DESCRIPTION OF PREFERRED EMBODIMENTS

Figure 1:
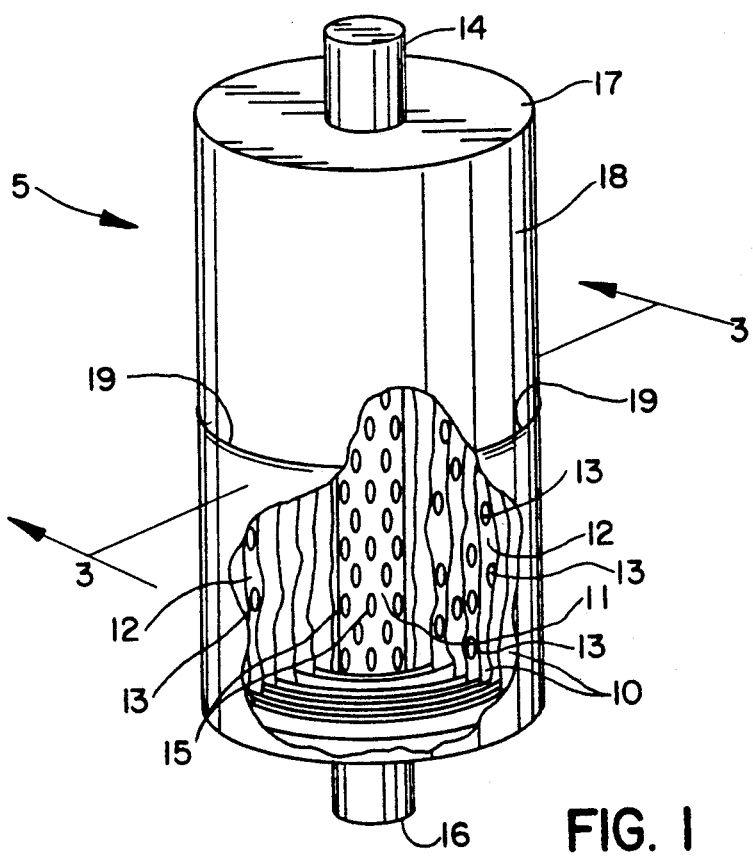
FIG. 1 is a perspective view, partly broken away, of the first embodiment gas filtering unit, illustrating the outer casing, air inlet and outlet and interior portions of the unit.
Figure 2:
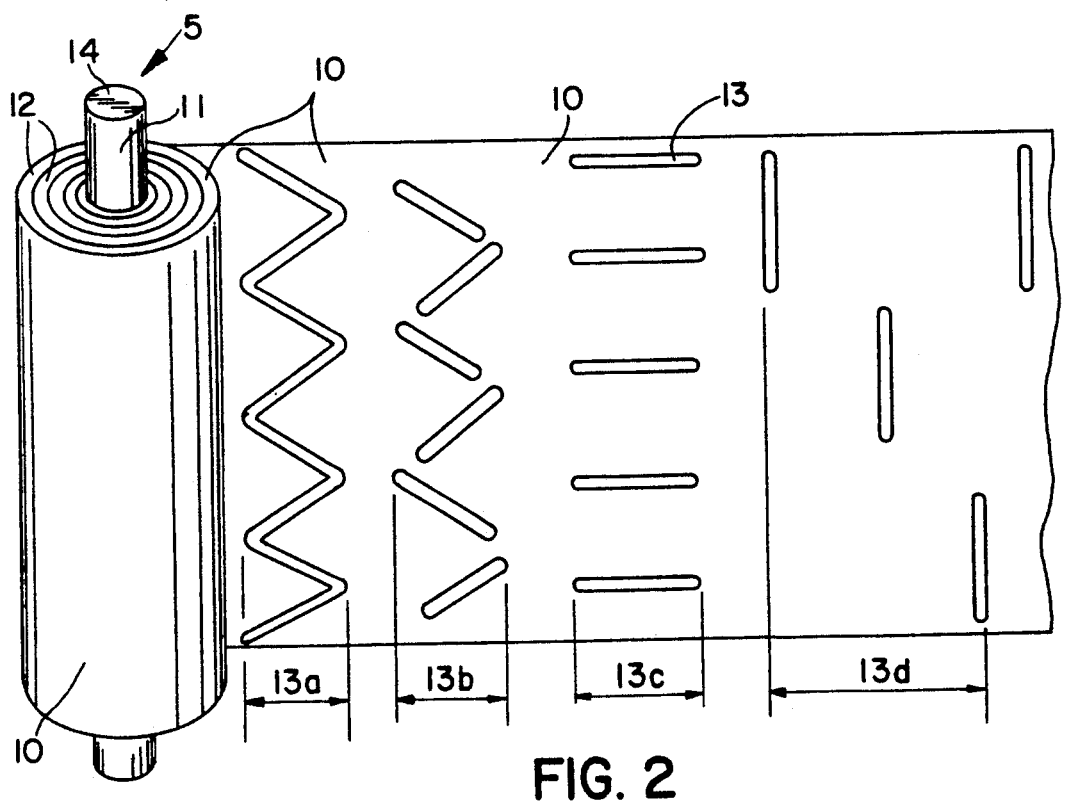
FIG. 2 is a perspective view of the filtering fabric partially wound around the center core structure and illustrating various configurations for placement of the actively filtering spacers.
Figures 3, 4, 5:
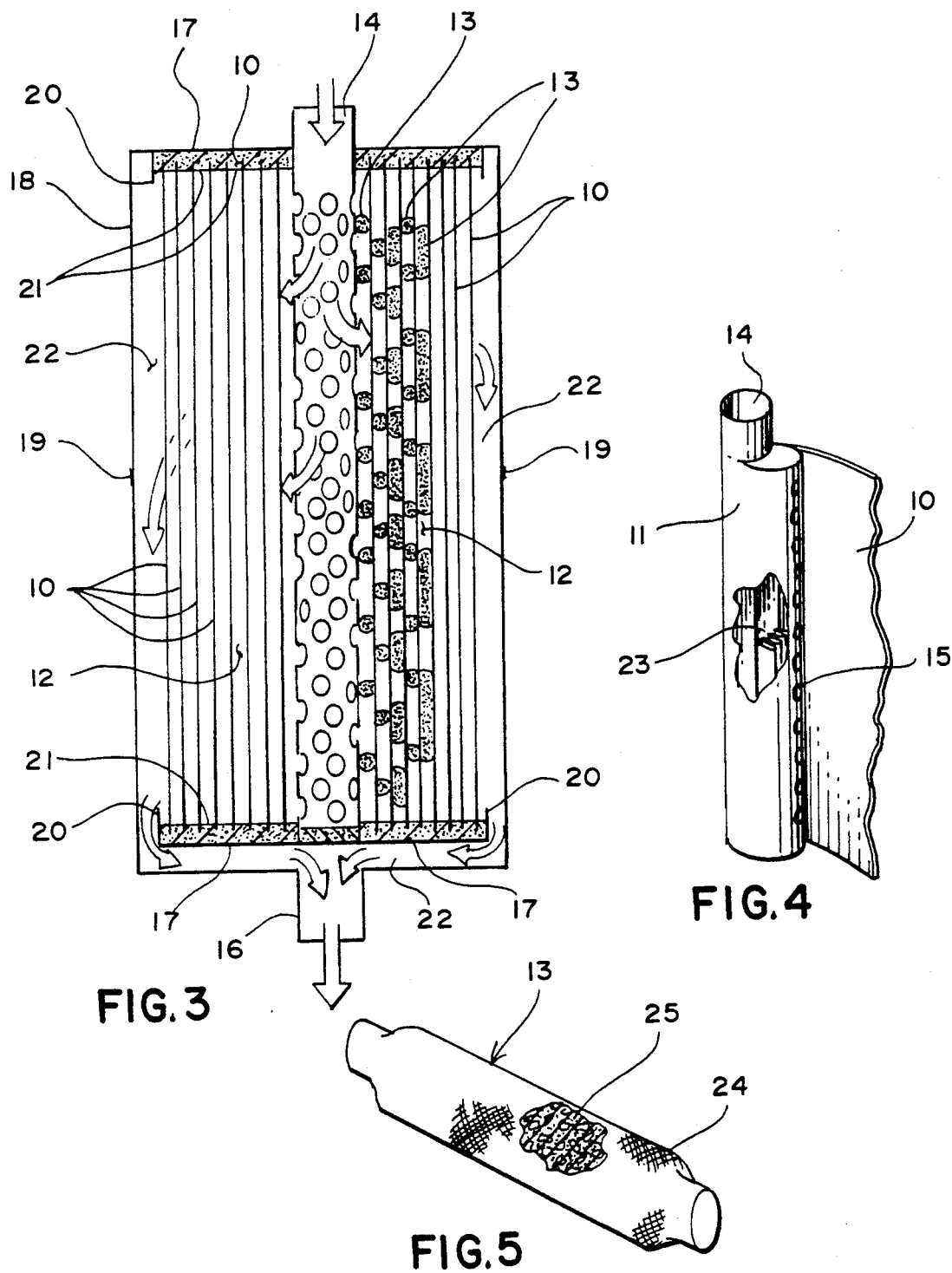
FIG. 3 is a sectional view of FIG. 1, taken along section lines 3—3 of FIG. 1 but in enlarged scale.
FIG. 4 is a perspective view, partly broken away, of the center core structure in its embodiment that basic structure, interior portions, and the attachment of a partial sheet of filtering fabric.
FIG. 5 is a perspective view, partly broken away, of a typical actively filtering spacer, illustrating the exterior mesh material and interior portions containing typical carbon pellets.

The first preferred embodiment of the present invention are best understood by referring to FIGS. 1-5 of the drawings, like numerals being used for like and corresponding parts of the various drawings. Referring to FIGS. 1-3 of the drawings, an embodiment of the gas filtering unit 5 is shown in which numeral 10 illustrates a sheet of variable length filtering fabric that is attached to and wound around a center core structure 11. The fabric 10 is typically fibrous, easily coilable, gas permeable and flexible, yet able to maintain a degree of rigidity so as to be a structurally supportive component of the gas filtering unit. One such fabric may advantageously be formed from polyester fibers. Granules of gas filtering or reactive media are embedded into the fabric 10, for the adsorption or reactive adsorption of a variety of contaminant gases. The preferred fabric does not contain glues or other adsorption hindering additives. It is known in gas filtration technology that the adsorption capacity of a given mass of carbon increases as the particle size decreases. Hence, the fine mesh carbon particles significantly increase the surface/exposure area and level of utilization of the carbon media. Activated carbon granules typically are employed to adsorb organic vapors and hydrocarbons. Specially treated carbon granules are typically employed to reactively adsorb specific contaminant gases. For example, treated carbon is typically employed to handle formaldehyde, cyanide compounds and various acid gases. Further, acid treated carbon granules may be embedded into the fabric 10 to remove ammonia, amines and other bases. Numerous other treated carbon granules may be utilized.

The filtering fabric 10 may alternatively be embedded with any suitable adsorptive, absorptive, chemisorptive or reactive agent. Such agents may be embedded into or affixed or coated onto any appropriate material, most typically polyester or foam. Two or more types of filtering fabric may be connected and utilized in a singular gas filtering unit.

The fibrous nature of the polyester fabric 10 of the preferred embodiment maximizes friction and turbulence of the airflow within the gas filtering chamber 12, thus enhancing utilization of and sorption by the gas filtering media. Further, this fibrous nature promotes enmeshment of the fabric 10 with the exterior mesh 24 (FIG. 5) of the actively filtering spacers 13, so as to help hold said spacers in place. Concurrently, this enmeshment of the actively filtering spacers 13 with the fabric 10 promotes further rigidity and structural integrity of the wound fabric 10 and entire gas filtering unit. The dimensions and quantity of the fabric 10 utilized may vary considerably according to: the natures and concentration of the contaminant gases; the volumes of air to be filtered; and the quantity and configurations of the actively filtering spacers 13 utilized.

The filtering fabric 10 is attached to the center core structure 11 at one end of the fabrics' width-wise edges. Various means of attachment may be employed. A gluing process, such as a hot melt type may be used, in which the fabric is directly adhered to the center core structure 11. Further, screws and washers, rivets, or staples may be employed as a means of directly fastening the fabric 10 to the center core structure 11. The center core structure 11 most typically employs a tubular configuration that is linear, rounded and is constructed of a rigid material, most typically a chemically inert plastic such as polypropylene or alternatively from other materials, such as stainless steel. The center core structure 11 incorporates an extended air inlet 14 that facilitates connection to the contaminate air source. The center core structure 11 is open at the air inlet 14 and is closed and air tight at the opposite end. The center core structure 11 is perforated or slotted 15 so as to allow airflow passage from said structure into the gas filtering chamber 12. The perforations or slots 15 are at frequent enough intervals and provide adequately sized openings to minimize air flow resistance. Accordingly, air flow openings of any suitable configuration may be employed. The length of the perforated area 15 typically is approximately equal to the width of the attached filtering fabric 10. The width-wise or circumferential dimension of the perforated area 15 may be varied so as to alter air flow patterns and resistance. The extended air inlet 14 is imperforate. The inside dimensions of the center core structure 11 are determined by the volume of air to be filtered in relation with the pressure drop of the filter.

It is known in gas filtration technology that the accumulation of particulate materials within a gas filtering media inhibits contact of the contaminate air source with said media. Hence, particulate filters are typically employed in the pretreatment of the contaminate air source, thus protecting and potentiating the downstream gas filtering agent. HEPA (High Efficiency Particulate Air) filters are highly effective in the removal of particulate materials.

FIG. 4 illustrates an additional embodiment of the center core structure, in which a HEPA filter 23 is advantageously incorporated, intrinsically into the center core structure. In a typical condition of this embodiment, an outer frame is molded from any suitable material such as halves. The frame originally includes two lengthwise polypropylene. HEPA filtering media 23 is sealed into the interior and central area of the center core structure 11. The air inlet 14 is part of the singular molded center core structure and protrudes out from the main body of the structure.

The filtering fabric 10 is attached to an exterior, lengthwise section of the center core structure. Once the air passes through the HEPA media 23, it exits the center core structure through the perforations 15 or slots and enters the gas filtering chamber 12. The center core structure 11 is rounded so as to allow the fabric 10 to be evenly wound around said structure and to facilitate the spiral-like configuration of the gas filtering chamber 12. In a variation of this method, the air path of the filtering unit is reversed. The gas-filtered air is passed through the HEPA filter 23 as it is exhausted out of the center core structure 14. This variation may be advantageously employed in applications requiring very low particle counts, such as clean rooms, as the final filtering stage prior to exhaust is the HEPA filter. Additionally, a HEPA filter may be incorporated downstream of the gas filtering chamber 12, typically positioned just before the air exhaust outlet 16. In yet a further embodiment of the center core structure 11, a cylindrical, canister type particulate air filter is utilized. This filter may typically be of the commonly available, prefabricated type used for the engines of motorized vehicles. In this embodiment a tube is attached and sealed to one end of the hollow center core of the canister filter, so as to create an air inlet. The fibrous fabric 10 is attached to an exterior, linear section of the canister filter. Canister type particulate air filters may be advantageously integrated into the gas filtering unit for the pretreatment of the contaminated air source. While such filters are typically less effective than HEPA filters, they are less costly. Canister-type cylindrical HEPA filters may also be employed as an actively particulate filtering center core structure.

Once the fibrous fabric 10 is attached to the center core structure 11, it is wound around the core structure 11 in a spiral-like configuration. Actively filtering spacers 13 are employed so as to structurally maintain an air flow, a further purpose of the actively filtering spacers 13 is to provide a means for the utilization of various combinations of adsorptive, absorptive, chemisorptive or reactive agents within the gas filtering chamber 12. Many such agents have physical structures or chemical properties that may preclude their use within a fabric material. Another purpose of the actively filtering spacers 13, is to provide a means of physical separation of dissimilar filtering agents. In gas filtration technology, it is known that certain gas filtering agents, when directly combined, may react unfavorably. The actively filtering spacers 13 may be appropriately spaced apart within the gas filtering chamber 12, thus averting the potential efficiency degrading effects of combining certain filtering agents within a singular filtering unit. A still further purpose of the actively filtering spacers 13 is for said spacers to act as a useful component in the overall structural integrity of the gas filtering chamber 12. The enmeshment of the actively filtering spacers 13 with the fibrous fabric 10 promotes further rigidity and structural support of the fibrous fabric 10 and entire gas filtering chamber 12.

The exterior 24 of the actively filtering spacers 13 is typically constructed from mesh material that may be easily formed into an elongated tubular configuration, typically by a heat sealing process. The mesh 24 will have pores that are sufficiently small so as to prevent passage of granules or pellets 25 therethrough. Polypropylene netting is advantageously employed in the preferred embodiment. The elongated mesh constructions 24 are entirely filled with any suitable adsorptive, absorptive, chemisoptive or reactive gas filtering agent or catalyst. Such exemplary agents may include pellets of alumina-coated with potassium permangenate, silica, oxidizing catalysts, zeolites as well as specially treated carbon. The open edges of the mesh material 24 are subsequently sealed so as to keep the filtering agents within said material. Alternatively, the actively filtering spacers may consist of strips or other configurations of prefabricated particulate filtering and/or gas absorptive, adsorptive, chemisorptive or reactive materials. In one such embodiment, remnants of the spirally wound charcoal impregnated fabric are formed into strips or any appropriate configuration and are advantageously employed as actively filtering spacers.

The actively filtering spacers 13 have a variety of suitable shapes and sizes. The diameter or width of the spacers 13 determines the width of the air flow channel within the gas filtering chamber 12. Suitable lengths for the actively filtering spacers 13 vary considerably. Typical lengths may range from 2" to 24" and combinations of variant lengths are advantageously utilized within one filtering unit. The actively filtering spacers 13 are strategically placed onto the fibrous fabric 10 before it is wound around the center core structure 11. A variety of spacer configurations is selectively advantageously employed. FIG. 2 illustrates four typical spacer configurations: spacers may be zig zagged into a pleated type configuration 13a, creating widthwise blockage in the air flow channel. This configuration insures an increased exposure level of the contaminant air source to the spacers 13. The spacers may be aligned in a herringbone type configuration 13b, so as to decrease static resistance while insuring a relatively high level of exposure of the contaminated air source to the spacers. Spacers maybe aligned parallel 13c to the width edges of the fibrous fabric 10 to achieve a minimal level of static resistance. Spacers may be placed perpendicular 13d to the width edges of the fibrous fabric 10 and staggered in accordance with corresponding spacers in adjoining vertical layers of the air flow channel. This method of positioning spacers creates controlled areas of enhanced pressure differentials from layer to layer, thus, maximizing outward perpendicular flow through the fibrous fabric 10. Numerous other spacer configurations may be advantageously employed. A variety of configurations may be advantageously combined within a singular gas filtering chamber.

A plurality of slots may be incorporated into the fibrous fabric with the actively filtering spacers positioned over such slots. This slot-spacer configuration increases the air flow into the specific spacer and simultaneously reduces the overall airflow resistance of the entire filter. The slot openings are sized smaller than the corresponding spacer and aligned to facilitate complete contact of the airflow through the slot with the spacer and to maintain the width of the airflow channel.

Once the actively filtering spacers 13 are placed onto fibrous fabric 10 in the appropriate configuration(s), the fabric 10 is firmly wound around the center core structure 11. As a result, the spacers 13 are compressed between the adjacent layers of fabric 10 and held in place. The position of the spacers is further secured by their enmeshment with the porous fibers of the fabric 10. A sheet of flexible, coilable, permeable particulate filtering material may be attached to the end of the fabric 10 so as to become the outermost layer of the gas filtering chamber 12. This final layer is employed to restrict any loose particles of carbon or other gas filtering agents from being exhausted out of the filtering unit.

Both width-wise edges of the fabric 10 are secured and sealed with end caps 17. The end caps 17 incorporate a 90° interiorly directed lip 20, typically 1" to retain and support the gas filtering chamber 12 within the end caps 17. The end caps 17 are constructed of any suitable non-porous material, most typically polypropylene. The attachment of the gas filtering chamber 12 to the end caps 17 is permanently secured, sealed and made air tight by any suitable adhesive sealant 21. One such sealant is a hot melt type. The end cap 17 on the air inlet 14 end of the filtering unit has a cutout to accommodate the air inlet tube 14. In the first preferred embodiment (FIGS. 1 and 3) extended end cap structures are utilized as a protective external casing 18 for the filtering unit and as an exhaust channel 22 for the filtered air. In this embodiment, the end cap structures incorporate an outer wall 18 that runs concentrically and further exterior to the outermost fabric layer of the gas filtering chamber 12. The lengths of the outer walls, when combined, are slightly longer than the length of the gas filtering chamber 12 to accommodate the exhaust air channel 22. The two structures are connected and sealed at their meeting point 19, thus making the outer casing 18 air tight. The end structure opposite the air inlet 14, typically employs an exhaust air tube 16 that is protruded outwardly from the outer wall of the exhaust air channel 22. Filtered air is thus passed through the outermost layer of the gas filtering chamber 12 and is directed along the exhaust air flow channel 22 and out of the gas filtering unit through the special coupling devices and/or dampers useful in various applications. In addition a bag-in, bag-out system may be employed. Further, air tight coverings may be placed onto the air inlet 14 and exhaust tube 16 which completely seals the gas filtering unit, thus ensuring complete containment of internal components during shipment, filter changing and disposal procedures.

SECOND PREFERRED EMBODIMENT

Figure 6:
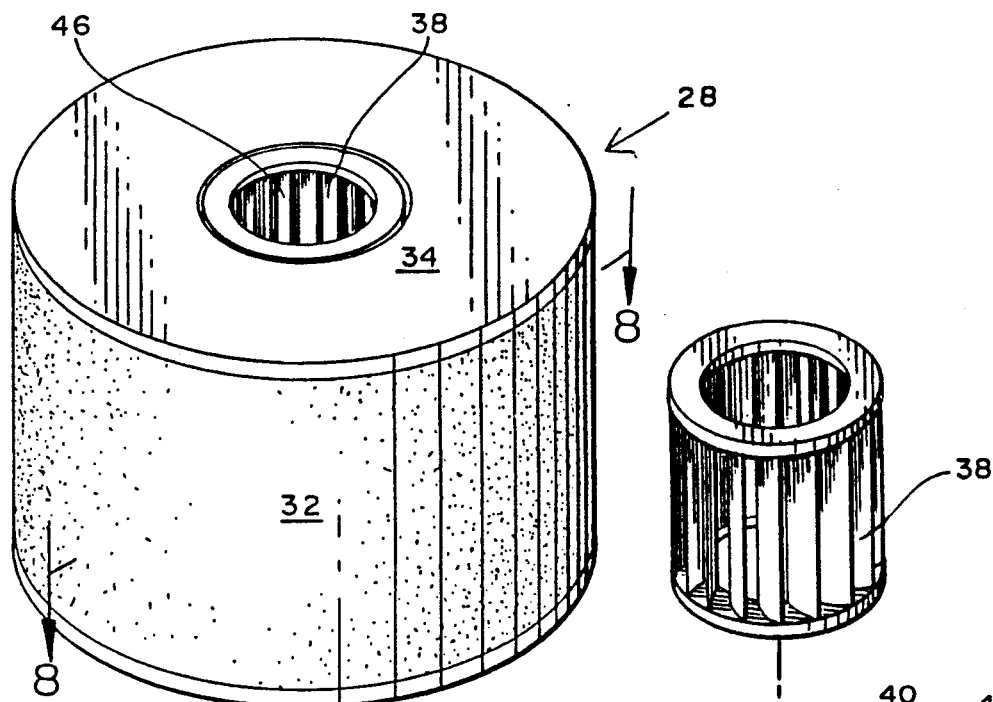
FIG. 6 is a perspective view of the second embodiment filter unit, illustrating the position of the top of the impeller wheel.
Figure 7:
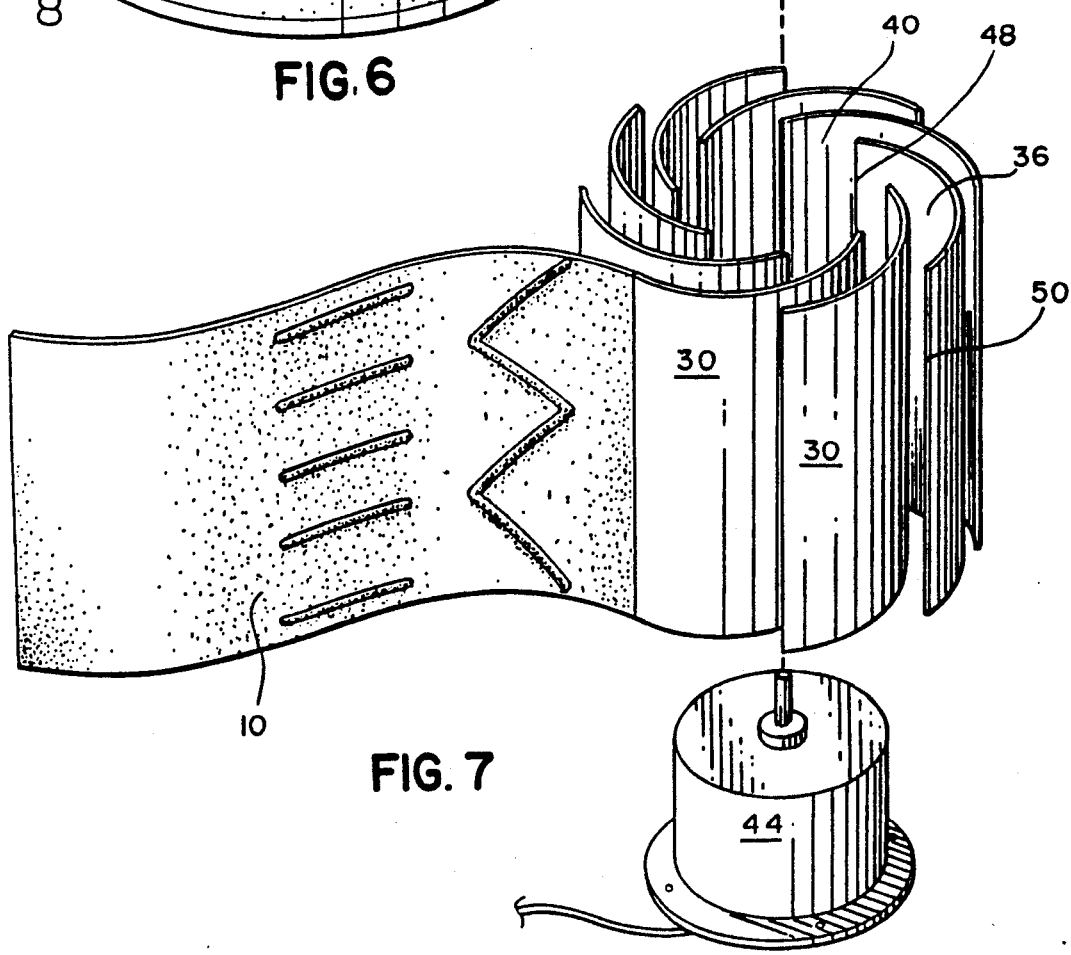
FIG. 7 is an exploded isometric view of the central manifold structure illustrating one exemplary sheet of filtering fabric attached to the infuser wing.
Figures 8, 9:
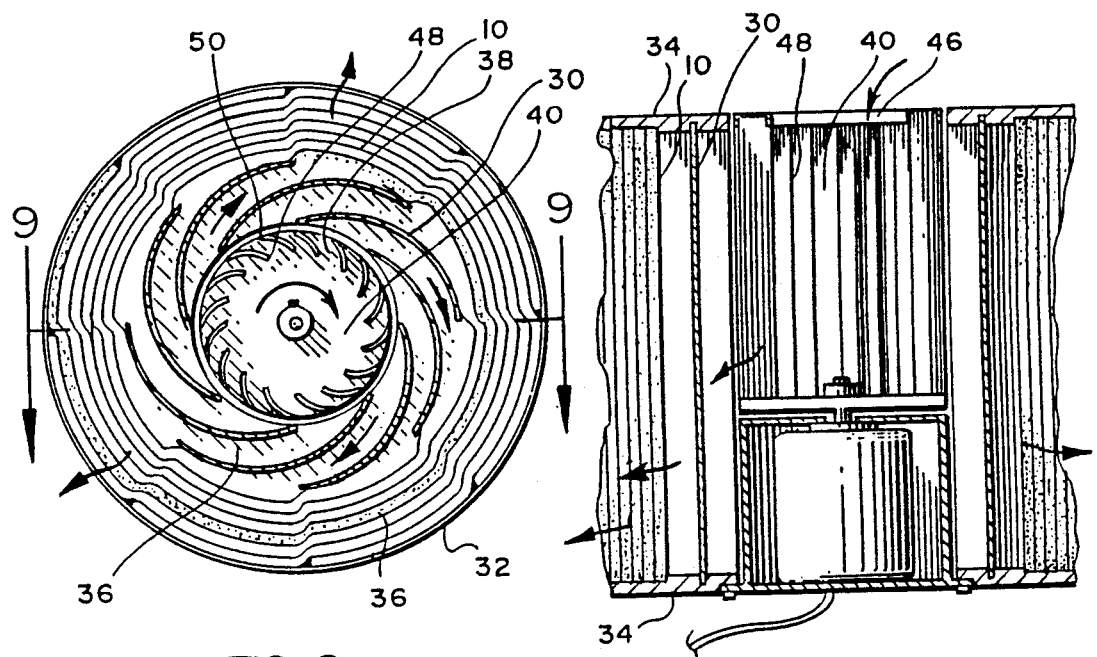
FIG. 8 is a sectional (top) view of FIG. 6 taken along section lines 8—8 of FIG. 6.
FIG. 9 is a sectional (side) view of FIG. 6 taken along section lines 9—9 of FIG. 8.
Figure 10:
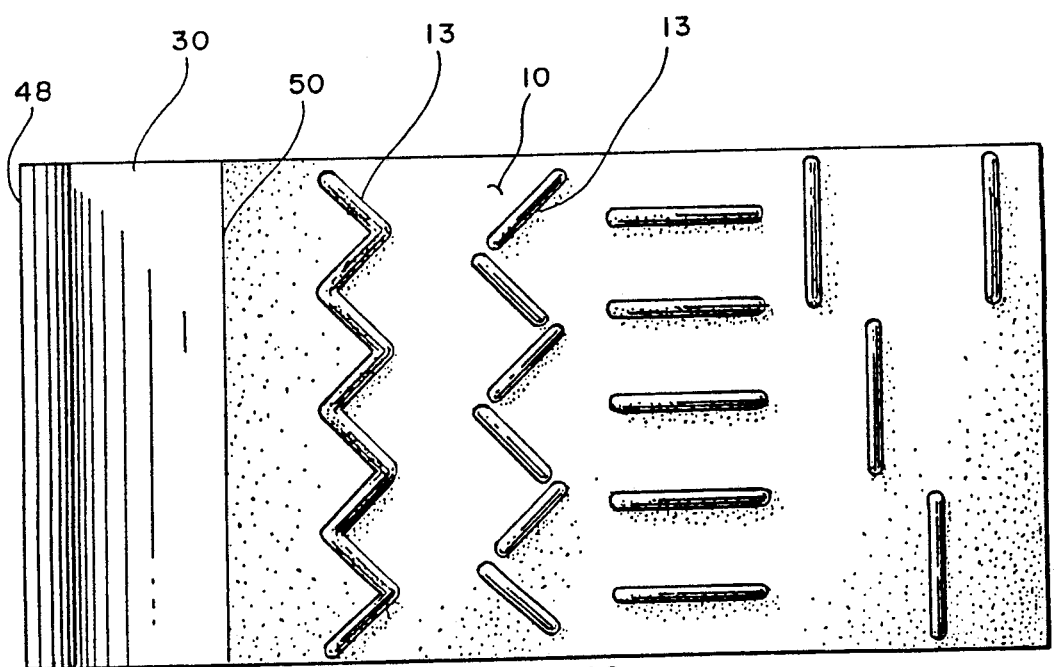
FIG. 10 is an unfolded view of one sheet of fabric attached to one infuser wing with optional spacers comparable to that shown in FIG. 2.

An alternate preferred embodiment of the present invention is best understood by referring to FIGS. 6-10 of the drawings. The device shown in FIG. 6 is a complete powered filter unit 28. A plurality of airflow infuser wings 30 are employed to form a central manifold structure 40. These wings 30 are nonpermeable, and typically formed from a smooth plastic material such as polypropylene. The infuser wings 30 have a slight curvature. The inside lengthwise edge 48 of each infuser wing 30 is aligned at substantially equidistant intervals around the side of the central manifold 40. The outside lengthwise edge 50 of each infuser wing 30 is aligned so as to form a circle with a larger diameter than the interior circle, thus forming a central manifold structure 40 with a plurality of individual airflow channels 36.

Each infuser wing 30 is attached to an individual sheet of the gas filtering fabric 10. The fabric 10 is typically attached by a glue, such as the hot melt type. The plurality of sheets of fabric 10 are spirally wound around the central manifold structure 40. The actively filtering spacers 13 are employed to physically separate the adjacent layers of fabric as an adjunct to the infusion wings 30, thus creating a plurality of air flow channels 36. An additional sheet of particulate filtering material 32 is utilized as a final filter and protective wrap around the outside of the assembly of wound sheets of gas filtering fabric 10.

The complete filter comprising the plurality of airflow infuser wings 30 with the corresponding sheets of attached fabric 10 and the final particulate filter wrap 32 are potted into end caps 34. The end caps 34 are nonpermeable and rigid and may be formed by an appropriate sealing or potting material such as hot melt glue. The structural integrity of the wings 30 and fabric assembly is thus maintained. Further, the end caps 34 prevent the contaminant air from bypassing the filter channels 36 and leaking out of the system.

Air is directed into the unitized filter component by an airflow impeller wheel 38 that is situated in the interior of the central manifold structure 40. The impeller wheel 38 is attached to a motor 44 which is typically located in the manifold 40 below the impeller wheel 38. The impeller wheel 38 and the motor 44 are secured to the base of an outer structural housing. This outer housing insures proper alignment of the unitized filter component to the impeller wheel 38. The curvature, length and alignment of the airflow infuser wings 30 are calculated to appropriately match the direction and velocity of the airflow output of the impeller wheel 38.

The contaminant air is drawn into the system through the air inlet 46. The impeller wheel 38 directs the contaminant air into the airflow channels 36.

In a successfully tested embodiment of one gas filtering unit 28, a filter containing 17 pounds of active gas filtering material is utilized to purify 150 CFM of air. The filter has an inside diameter of 17", is 12" high and has an inside open area 8" in diameter. A backwards curved motorized impeller is located in the interior of the central manifold structure 40. This air handling unit requires 85 watts of electrical power. The central manifold structure 40 incorporates 8 airflow infuser wings 30 which form eight separate airflow channels 36. Each wing 30 is 1/16" thick, 12" high and 6" wide. The infuser wings 30 are fabricated from high density polyethylene which is effectively heat formed to an appropriate curve that is based on the equations found in the following pages.

Each wing 30 is attached with hot melt glue to a separate sheet of the gas filtering fabric 10 which is 12" high, 36" long and ⅜" thick. The eight sheets, which total 24 square feet of fabric 10, are spirally wound around the central manifold structure 40. The actively filtering spacers 13 are ⅜" to ½" thick and are 12" long.

Each airflow channel contains approximately one pound of actively filtering spacers 13 which comprise a variety of types of granular activated carbon. The final particulate filter wrap 32 is a polyester filter media that is 12"×53" and is ½" thick.

Representing the velocity of a fluid by a vector, a velocity triangle can be generated at the discharge of the impeller wheel. The following formulae were employed in the design tested embodiment identified above and are specific for an eight infuser wing unit. The discharge angle of the air can be found using the following equation:

$$A = \operatorname{Arctan}(Cm/Cu) \tag{1}$$

WHERE
$Cm = 6/5 \cdot Q/(PI \cdot R \cdot b)$
$Cu = (N \cdot R \cdot PI/360 - Cm/\tan(B)) \cdot SF$
AND
$N$ = ANGULAR SPEED (R.P.M.)
$R$ = EXTERNAL RADIUS (INCHES)
$Q$ = FLOW (CFM)
$b$ = HEIGHT OF THE IMPELLER WHEEL (INCHES)
$B$ = DISCHARGE ANGLE OF BLADES (DEGREES)
$A$ = DISCHARGE ANGLE OF THE AIR
$SF$ = SLIP FACTOR
$PI$ = 3.141592

Since no torque is applied to a fluid particle once it has left the impeller, the angular momentum of the particle is therefore constant, that is it follows a path along which $V \cdot r = cte$. This helps us determine the path of the air after it has left the wheel. Therefore, it is found that $$\frac{Q \cdot t \cdot (r + Ro)}{720 (r - ro) b} = \text{constant}$$

Developing the equation to accommodate eight blades it was determined that:

$$r = (A + B \cdot t) \cdot f(t) \tag{2}$$

WHERE
$A = 90 \, ro^2/th + 45 ro$
$B = ro$ $f(t) = 1/(90 ro/th + 45 - t)$
$t$ = independent parameter [degree]

Equation 2 represents the most efficient path of the air leaving the impeller wheel. Based on this equation 3 which is used to design the airflow infuser wings 30. Equation 3 accomodates the physical properties of the air described in equation 2 simultaneously allowing for a compact efficient design of the central manifold structure. Equation 2 represents the most efficient path of the air leaving the impeller wheel. Thus equations 3 and 4 are used to design the airflow infuser wings. Equation 3 traces the first portion of the wing keeping the entrance angle equal to the angle found using equation 1. Depending on the magnitude of angle A, this portion varies between 0-30% of the wing path. The remaining portion of the wing is described by using equation 4 which accommodates the physical properties of the air described in equation 2 simultaneously allowing for a compact efficient design of the central manifold structure. Equations 3 and 4 are as follows:

$r_1 = (x^2 + y^2)^{\frac{1}{2}}$ $x = (c - c_1) \cdot I/9$ $y = a \cdot (1 - (x + c_1 - c)^2/c^2)^{\frac{1}{2}} + r - a_1$ $t = 90 - \arctan(y/x)$ $r_2 = (A_1 + B_1 \cdot t) \cdot f_1(t)$   EQUATION 4

WHERE $f_1(t') = ((e^{2t'}/(e^{18} - e^{t'})) + t')/10 \cdot (Y_0 \cdot n/B/360 - 1)$

FOR $0 < t - t_0 \leq ((60° - t_0)/5$

OR $f_1(t') = (y_0 \cdot n/B_1/360)$

FOR $(60° - t_0)/5 < t - t_0 \leq 60° - t_0$

AND $t' = t - t_0$
$Y_0 = R - A_1$
$n = 360°/(60° - t_0)$
$a = (R - 0.4(R - r))/\cos(20°) - r$
$c = (R - 0.4(R - r)) \cdot \sin(20°)$
$c_1 = c^2 \cdot \tan(A)/(a^2 + c^2 \cdot (\tan(A_1))^2)^{\frac{1}{2}} + c$
$a_1 = a \cdot (1 - (c_1 - c)^2/C^2)^{\frac{1}{2}}$
r = radius where the wing starts
R = radius where the wing ends
$t_0 = \arctan((c - c_1)/(a - a_1 + n))$ $A_1$, and $B_1$, are parameters found using the computational program set forth below that allows the infuser wings to have the correct angle and throat at the entrance and the end of the wing respectively. The following data are a real application of the formulae presented in equations 1, 3, and 4 as they apply to this one filter.

I) ANGLE A
INPUT DATA
  B = DISCHARGE ANGLE = 30
  R = EXTERNAL RADIUS 3.74 INCHES
  b = HEIGHT OF IMPELLER WHEEL 1.70 INCHES
  Q = FLOW 150 CFM
  N = RPM 2280
  SF = SLIP FACTOR 0.9
OUTPUT DATA
  A = 9.7
II) PATH OF THE WING
INPUT DATA r = 3.74 − 0.3 = 4.04"
  R = 4.04 + 1.5 = 5.54"
  A = 9.7
COMPUTER CALCULATIONS
  A1 = 4.163055096
  B1 = 0.01315
  to = 10.08°
  C = 1.689579508
  C = 0.9611452932
  a = 0.6020815467
  a = 0.5432510638
  y = 1.376944904
  n = 7.211141831

Output data: the explicit representation of the path of the wing in polar coordinates is:

| t (degrees) | r (inches) |
|---|---|
| 0.00 | 4.04 |
| 1.14 | 4.05 |
| 2.28 | 4.07 |
| 3.41 | 4.08 |
| 4.54 | 4.09 |
| 5.65 | 4.11 |
| 6.77 | 4.12 |
| 7.88 | 4.14 |
| 8.98 | 4.15 |
| 10.08 | 4.16 |
| 11.00 | 4.18 |
| 16.00 | 4.29 |
| 21.00 | 4.46 |
| 26.00 | 4.60 |
| 31.00 | 4.74 |
| 36.00 | 4.88 |
| 41.00 | 5.02 |
| 46.00 | 5.15 |
| 51.00 | 5.29 |
| 56.00 | 5.43 |
| 60.00 | 5.54 |

The first portion of the wing is represented by equation 3 between 0°–10.081°, and the rest is represented by equation 4 between 10.08° and 60°.

The foregoing equations for an eight wing infuser unit are best solved by inserting the following program into a computer with basic language:

```
5 DEFDBL A-H,L-Z
10 INPUT "R=";R
12 INPUT "r="; R1
14 INPUT "angle=";E
16 INPUT "FILTER #="; FIL$
20 DIM RADIUS (70), PHI(70)
30 BET=.4:PI=3.1415927#
40 A=(R-BET*(R-R1))#COS(20*PI/180)-R1
50 B=(R-BET*(R-R1))*SIN(20*PI/180)
60 IF E=90 THEN 70 ELSE 80
70 B1=0:GOTO 90
80 B=-B^2*TAN(E*PI/180)/(A^2+B^2*(TAN(E*PI/180))^2)^.5+B
90 A1=A*(1-(B1-B)^2)^.5
100 X1=B-B1:X=0
110 FOR I=1 TO 10
120 IF X=0 THEN 140
130 GOTO 150
140 T=0
150 Y=A*(1-(X+B1-B)^2)^.5+R1-A1
160 IF X=0GOTO 180
170 T=90-ATN(Y/X)*180/PI
180 RR=(X^2+Y^2)^.5
190 REM "PRINT DATA"
200 X=(B-B1)*I/9
210 RADIUS(I)=RR
220 PHI(I)=T
230 NEXT I
240 I=10
250 BE=ATN((B-B1)/(A-A1+R1))*180/PI
260 BB=90-BE
270 AR=(A-A1+R1)/COS(BE*PI/180):F=0:H=1:FAC=0.0364
280 X1=(AR+FAC*(F-H))*COS((F-H)*PI/180)
290 X2=(AR+FAC*(F+H))*COS((F+H)*PI/180)
300 Y1=(AR+FAC*(F-H))*SIN((F-H)*PI/180)
310 Y2=(AR+FAC*(F+H))*SIN((F+H)*PI/180)
320 G=ATN((Y2-Y1)/(X2-X1))*180/PI
330 IF (ABS(G-BB)>5) AND (G>BB) THEN 380
340 IF (ABS(G-BB)>5) AND (G<BB) THEN 390
```

```
350 IF ABS(G-BB)<.01 THEN 420
350 IF ABS(G-BB)<.01 THEN 420
360 IF G>BB THEN 400
370 IF G<BB THEN 410
380 FAC=FAC+.005:GOTO 280
390 FAC=FAC+.005:GOTO 280
400 FAC=FAC+.00005:GOTO 280
410 FAC=FAC-.00005:GOTO 280
420 N=360/(60-BE)
430 Y=R-AR
440 BX=INT(BE)+1
450 J=BX:NN=72/N:XY=0
460 F=J-BE
470 X=Y*N/FAC/360-1
480 IF F<NN THEN 500
490 GOTO 520
500 ZZ=(EXP(2*F)/(EXP(18)-EXP(F))+F/110
510 GOTO 530
520 ZZ=1
530 RR=AR+FAC*F*(X*ZZ+1)
540 REM "PRINT DATA"
550 I=I+1
560 RADIUS (I)=RR
570 PHI(I)=J
590 IF XY=1 THEN 673
600 J=J+1
610 IF J<60 THEN 460
670 J=60:XY=1:GOTO 460
673 COUNT=I
675 CLS
687 SCREEN 1.0
690 COLOR 0.1
700 WINDOW (-2*R,-2*R*.696)-(2*R,2*R*.696)
701 LINE (-R*1.1,-R*1.1)-(R*1.1,-R*1.1)
702 LINE (R*1.1,-R*1.1)-(R*1.1,R*1.1)
703 LINE (-R*1.1,-R*1.1)-(-R*1.1,R*1.1)
704 LINE (-R*1.1,R*1.1) (R*1.1,R*1.1)
710 FOR J=0 TO 360 STEP 45
720 FOR I=1 TO COUNT
730 COX-RADIUS(I)*COS((PHI(I)+J)*PI/180)
740 COY=RADIUS(I)*SIN((PHI(I)+J)*PI/180)
750 PSET(COX,COY),1
760 NEXT I
770 NEXT J
774 FOR J=0 TO 360
776 C=R*VPD(J)
783 D=R*SOM(J)
790 PSET(C,D),2
800 NEXT J
810 FOR K=0 TO 360
820 C=R_1+COS(K)
830 D=R_1*SIN(K)
840 PSET(C,D),2
850 NEXT K
851 PSET(0,0)
852 LOCATE 4,1;PRINT "R=";R
853 LOCATE 5,1;PRINT "r=";R_1
854 LOCATE 6,1;PRINT "fhi=";E
855 LOCATE 2,11:PRINT "BLADES PATH FILTER";FIL$
856 LOCATE 22,1
858 KEY OFF
858 END
```

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification, and the appended claims.

What is claimed is:

1. The method of filtering noxious particulate materials and gases from ambient air in a cartridge having a pneumatic material, a central manifold, adjacent spirally wound material sheets of fibrous charcoal having spaces therebetween and driving means for driving ambient air through said cartridge comprising the steps of:

providing a filtering medium which promotes the movement of air from a central portion of said cartridge both spirally and radially through fibrous spirally wound impregnated material, driving ambient air through the cartridge with said driving means;

diverting the flow of said ambient air in the spaces between the adjacent spirally wound material sheets by providing a plurality of gas adsorptive, absorptive, chemisorptive, reactive or particulate filtering materials used as spacers between the fibrous charcoal spirally wound sheets.

2. The method of filtering noxious particulate materials and gases from ambient environment in a filtering unit having spirally wound material having an inner portion and defining an intersticial area for the flow of pneumatic material in the interior portion of the filter medium and surrounding a central manifold comprising the steps of:

providing filtering medium which promotes the movement of air from a central portion of a cartridge both spirally and radially through fibrous spirally wound impregnated material, positioning infuser wings at the interior portion of the filtering medium which define a central manifold and a path for diverting the flow of pneumatic material in the intersticial area defining a pathway between the adjacent spirally wound material sheets by conforming the pneumatic material to said pathway between the material sheets, positioning an impeller in the manifold proportioned to centrifugally drive the air from the central manifold outwardly through the infusers and into the spirally wound fabric, and driving the air by actuating the impeller.

3. In the method of claim 2, positioning spacers between adjacent layers of filter medium.

4. In the method of claim 2, encapsulating the layers of filter medium between opposed end caps.

5. A filter cartridge having a body and ends comprising, in combination, a central manifold of tubular configuration blocked at one end and having a plurality of perforations along its periphery, a spirally wound fibrous material impregnated with activated or treated charcoal and/or other filtering agents that are adsorptive, absorptive, chemisorptive, reactive or particulate filtering secured at its inner end to the manifold and spirally wrapped there around to form the cartridge body, and a plurality of agitator spaces positioned interiorly between adjacent portions of the spirally wound fibrous impregnated material and spaced from said cartridge ends to thereby assist in spacing the same and positioned in a fashion to promote pneumatic agitation to the point of generating some degree of turbulence interiorly of the filter while pneumatic gases are pumped to the interior portion of the manifold and pass through the perforations of said manifold and then outwardly through the fibrous material as well as spirally around the fibrous material and between sheets of the same.

6. In the filter cartridge of claim 5, said agitator spacers being formed of a penetrable exterior bag-like formed material with pelletized activated members interiorly of the bag-like material which are formulated to attack and absorb or adsorb a variety of noxious gases.

7. In the filter cartridge of claim 5, a plurality of slots in the fibrous charcoal impregnated material to permit enhanced transverse penetration of the airflow into the spirals from the spacing area between various ones of the spirally wound members.

8. In the filter cartridge of claim 7 above, said agitator spacers being positioned over the slots provided in the fibrous charcoal impregnated material.

9. In the filter cartridge of claim 5, a HEPA (High Efficiency Particulate Air) filter operatively positioned in the interior of the tubular central manifold.

10. A filter cartridge comprising, in combination, a cartridge body, a central manifold of tubular configuration blocked at one end and having a plurality of perforations along its periphery interiorly of the cartridge body, a spirally wound fibrous material impregnated with activated or treated charcoal and/or other filtering agents that are adsorptive, chemisorptive, reactive or particulate filtering secured at its inner end to the manifold and spirally wrapped there around to form the cartridge body, a plurality of spacers positioned interiorly between adjacent portions of the spirally wound fibrous impregnated material to thereby assist in spacing the same and positioned in a fashion to promote pneumatic agitation to the point of generating some degree of turbulence interiorly of the filter while pneumatic gases are pumped to the interior portion of the manifold and pass through the perforations of said manifold and then outwardly through the fibrous material as well as spirally around the fibrous material and between sheets of the same, said spacers being formed of a penetrable exterior bag-like formed material with pelletized activated members interiorly of the bag-like material which are formulated to attack and adsorb or adsorb a variety of noxious gases.

11. A filter cartridge comprising, in combination, a central manifold of tubular configuration blocked at one end and having a plurality of perforations along its periphery, a spirally wound fibrous material impregnated with activated or treated charcoal and/or other filtering agents that are adsorptive, absorptive, chemisorptive, reactive or particulate filtering secured at its inner end to the manifold and spirally wrapped there around to form a cartridge body, a plurality of spacers positioned interiorly between adjacent portions of the spirally wound fibrous impregnated material to thereby assist in spacing the same and positioned in a fashion to promote pneumatic agitation to the point of generating some degree of turbulence interiorly of the filter while pneumatic gases are pumped to the interior portion of the manifold and pass through the perforations of said manifold and then outwardly through the fibrous material as well as spirally around the fibrous material and between sheets of the same, and a HEPA filter operatively positioned in the interior of the tubular central manifold.

12. A filter unit comprising, a filter cartridge, end caps for said cartridge, infuser wings centrally positioned between opposed end caps and secured thereto, each infuser wing having inside and outside edges and ends and a gas path defining portion therebetween, said inside edges defining a manifold, an impeller positioned in the manifold, means for driving the impeller, and a plurality of filter medium sheets attached to the outer edges of the infusers and spirally wound in spaced relation to each other thereby defining air flow channels between opposed sheets.

13. In the filter unit of claim 12, said infuser wings having a curvilinear shape between the edges.

14. In the filter unit of claim 12, a wrap engaging the edges of the filter sheets remote from the infuser wings.

15. In the filter unit of claim 12, spacers positioned between the spirally wound sheets.

16. In the filter unit of claim 12, said filter sheets being fibrous and impregnated with an activated charcoal.

17. In the filter unit of claim 12, said infusers being developed in accordance with the following formula:

$r_1 = (x^2 + y^2)^{\frac{1}{2}}$; $t = 90° - \text{Arctan}(y/x)$ $r_2 = (A_1 + B_1 t) \cdot f_1(t)$.

* * * * *